United States Patent
Sterkin et al.

(10) Patent No.: US 12,190,440 B2
(45) Date of Patent: Jan. 7, 2025

(54) METHOD OF GENERATING MULTI-LAYER REPRESENTATION OF SCENE AND COMPUTING DEVICE IMPLEMENTING THE SAME

(71) Applicant: SAMSUNG ELECTRONICS CO., LTD., Suwon-si (KR)

(72) Inventors: Gleb Mikhaylovich Sterkin, Moscow (RU); Pavel Ilyich Solovev, Moscow (RU); Denis Mikhaylovich Korzhenkov, Moscow (RU); Victor Sergeevich Lempitsky, Yerevan (AM); Taras Andreevich Khakhulin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 18/083,354

(22) Filed: Dec. 16, 2022

(65) Prior Publication Data

US 2023/0123532 A1 Apr. 20, 2023

Related U.S. Application Data

(63) Continuation of application No. PCT/KR2022/003655, filed on Mar. 16, 2022.

(30) Foreign Application Priority Data

Mar. 16, 2021 (RU) .......................... RU2021106881

(51) Int. Cl.
*G06T 15/50* (2011.01)
*G06T 7/50* (2017.01)
(Continued)

(52) U.S. Cl.
CPC ................ *G06T 15/50* (2013.01); *G06T 7/50* (2017.01); *G06T 7/90* (2017.01); *G06T 15/08* (2013.01);
(Continued)

(58) Field of Classification Search
CPC .. G06T 15/50; G06T 7/50; G06T 7/90; G06T 15/08; G06T 15/10; G06T 17/20;
(Continued)

(56) References Cited

U.S. PATENT DOCUMENTS 6,320,978 B1 * 11/2001 Szeliski .................. G06T 7/593
382/154
6,348,918 B1 * 2/2002 Szeliski .................. G06T 7/593
345/419
(Continued)

FOREIGN PATENT DOCUMENTS

CN 111968036 A 11/2020
RU 2726160 C1 9/2020

OTHER PUBLICATIONS

International Search Report (PCT/ISA/210) and Written Opinion (PCT/ISA/237) issued Jun. 22, 2022 by the International Searching Authority in International Application No. PCT/KR2022/003655.
(Continued)

*Primary Examiner* — Jeffery A Brier
(74) *Attorney, Agent, or Firm* — Sughrue Mion, PLLC

(57) ABSTRACT

The present disclosure relates to the field of artificial intelligence (AI) and neural rendering, and particularly to a method of generating a multi-layer representation of a scene using neural networks trained in an end-to-end fashion and to a computing device implementing the method. The method of generating a multi-layer representation of a scene includes: obtaining a pair of images of the scene, the pair of the images comprising a reference image and a source (Continued)

image; performing a reprojection operation on the pair of images to generate a plane-sweep volume; predicting, using a geometry network, a layered structure of the scene based on the plane-sweep volume; and estimating, using a coloring network, color values and opacity values for the predicted layered structure of the scene to obtain the multi-layer representation of the scene; wherein the geometry network and the coloring network are trained in end-to-end manner.

15 Claims, 15 Drawing Sheets

(51) Int. Cl.
  *G06T 7/90* (2017.01)
  *G06T 15/08* (2011.01)
  *G06T 15/10* (2011.01)
  *G06T 17/20* (2006.01)
(52) U.S. Cl.
  CPC .............. *G06T 15/10* (2013.01); *G06T 17/20* (2013.01); *G06T 2207/10012* (2013.01); *G06T 2207/10016* (2013.01); *G06T 2207/10024* (2013.01); *G06T 2207/20081* (2013.01); *G06T 2207/20084* (2013.01); *G06T 2207/20212* (2013.01); *G06T 2207/30244* (2013.01)
(58) Field of Classification Search
  CPC . G06T 2207/10012; G06T 2207/10016; G06T 2207/10024; G06T 2207/20081; G06T 2207/20084; G06T 2207/20212; G06T 2207/30244; G06T 2210/62; G06T 15/20; G06T 15/503; G06N 3/045; G06N 3/084
  See application file for complete search history.

(56) References Cited

U.S. PATENT DOCUMENTS

| | | | |
|---|---|---|---|
| 8,619,083 B2 | 12/2013 | Nickolov et al. | |
| 9,824,486 B2 | 11/2017 | Hu et al. | |
| 9,916,679 B2 | 3/2018 | Flynn et al. | |
| 10,911,732 B2 | 2/2021 | Kar et al. | |
| 10,950,037 B2 | 3/2021 | Sunkavalli et al. | |
| 11,055,910 B1 | 7/2021 | Deng et al. | |
| 2011/0199379 A1* | 8/2011 | Benien ................ | G06T 15/205 345/427 |
| 2020/0137380 A1 | 4/2020 | Supikov et al. | |
| 2020/0226736 A1 | 7/2020 | Kar et al. | |
| 2020/0320777 A1 | 10/2020 | Meshry et al. | |

OTHER PUBLICATIONS

Search Report and Office Action issued May 31, 2022 by the Russian Patent Office in Russian Application No. 2021121536.
Zhou, T., et al., "Stereo Magnification: Learning view synthesis using multiplane images", Cornell University, arXiv:1805.09817, May 2018, pp. 1-13.
Shin, D., et al., "3D Scene Reconstruction with Multi-Layer Depth and Epipolar Transformers", 2019 IEEE/CVF International Conference on Computer Vision (ICCV), Feb. 27, 2020, pp. 2172-2182 (12 pages).
Chen, Y., et al., "DSGN: Deep Stereo Geometry Network for 3D Object Detection", 2020 IEEE/CVF Conference on Computer Vision and Pattern Recognition, Aug. 5, 2020, pp. 12533-12542 (11 pages).
Khakhulin, T., et al., "Stereo Magnification with Multi-Layer Images", arXiv: 2201.05023v1, Jan. 13, 2022, pp. 1-15 (16 pages).
Aliev, K.-A., et al., "Neural point-based graphics", Computer Vision—ECCV 2020, pp. 1-17, Cham, 2020.
Attal, B., et al., "MatryODShka: Real-time 6DoF video view synthesis using multi-sphere images", In European Conference on Computer Vision (ECCV), Aug. 3, 2020, pp. 1-18.
Broxton, M., et al., Immersive light field video with a layered mesh representation. ACM Trans. Graph., vol. 39, No. 4, Article 86, Jul. 2020, pp. 86:1-86:15.
Chen, S., et al., "Interpolation for image synthesis", Apple Computer Inc., 20th Annual Conference on Computer Graphics and INteractive Techniques, 1993, p. 279-288.
Debevec, P., et al., "Modeling and rendering architecture from Photographs: A hybrid geometry and image-based approach", Proceedings of the 23$^{rd}$ Annual Conference on Computer Graphics and Interactive Techniques, pp. 11-20, 1996.
Flynn, J., et al., "Deep View: View synthesis with learned gradient descent", Computer Vision and Pattern Recognition, 2019, pp. 2367-2376.
Gortler, S., et al., "The Lumigraph", 23rd Annual Conference on Computer Graphics and Interactive Techniques, 1996, pp. 43-54.
Hedman, P., et al., "Deep Blending for Free-Viewpoint Image-Based Rendering", ACM Trans. Graph, vol. 37, No. 6, Article 257, Dec. 2018, pp. 257:1-257:15.
Hedman, P., et al., " Scalable inside-out image-based rendering", HAL Open Science, ACM Trans. Graph, vol. 35, No. 6, 2016, 12 pages.
Ravi, N., et al., "Accelerating 3d deep learning with pytorch3d", arXiv:2007.08501v1 [cs.CV], Jul. 16, 2020, pp. 1-18.
Kobbelt, L., et al., "A Survey of Point-Based Techniques in Computer Graphics", Computers & Graphics, vol. 28, No. 6, Jul. 12, 2004, pp. 1-23.
Lin, K.-E., et al., "Deep Multi Depth Panoramas for View Synthesis", Computer Vision—ECCV, 2020, pp. 1-17.
Liu, L., et al., "Neural Sparse Voxel Fields", Advances in Neural Information Processing Systems, vol. 33, 202, pp. 1-13.
Lombardi, S., et al., "Neural vols. Learning Dynamic Renderable Volumes from Images", ACM Trans Graph, vol. 38, No. 4, Article 65, Jul. 2019, pp. 65:1-65:14.
Mildenhall, B., et al., "Local Light Field Fusion: Practical View Synthesis with Prescriotive Sampling Guidelines", ACM Trans. Graph., vol. 38, No. 4, Article 29, Jul. 2019, pp. 29:1-29:14.
Mildenhall, B., et al., "NeRF: Representing Scenes as Neural Radiance Fields for View Synthesis", ECCV, 2020, pp. 1-17.
Niklaus, S., et al., "3D Ken Burns Effect from a Single Image", ACM Trans. Graph., vol. 38, No. 6, Article 184, arXiv:1909.05483v1 [cs.CV], Sep. 12, 2019, pp. 184:1-184:15.
Porter, T., et al., "Compositing Digital Image", Computer Graphics, vol. 18, No. 3, Jul. 1984, pp. 253-259.
Riegler, G., et al., "Free View Synthesis", Computer Vision—ECCV, 2020, pp. 1-17.
Shih, M.-L., et al., "3D Photography using Context-aware Layered Depth Inpainting", IEEE/CVF Conference on Computer Vision and Pattern Recognition, 2020, pp. 8028-8038.
Sitzmann, V., et al., "Deep Voxels: Learning Persistent 3D Feature Embeddings", Computer Vision and Pattern Recognition, IEEE, 2019, pp. 2437-2446.
Srinivasan, P. et al., "Pushing the Boundaries of View Extrapolation with Multiplane Images", IEEE/CVF Conference on Computer Vision and Pattern Recognition, 2019, pp. 175-184.
Szeliski, R., et al., "Stereo Matching with Transparency and Matting", International Journal of Computer Vision, vol. 32, No. 1, 1998, pp. 1-17.
Tewari, A., et al., "State of the Art on Neural Rendering", Computer Graphics Forum, vol. 39, No. 2, 2020, pp. 701-727.
Thies, J., et al., "Deferred Neural Rendering: Image Synthesis using Neural Textures", ACM Trans. Graph., vol. 38, No. 4, Jul. 2019, pp. 1-12.
Tucker, R., et al., "Single-View View Synthesis with Multiplane Images", IEEE/CVF Conference on Computer Vision and Pattern Recognition, 2020, pp. 551-560.
Wiles, O., et al., "SynSin: End-to-end View Synthesis from a Single Image", IEEE/CVF Conference on Computer Vision and Pattern Recognition, 2020, pp. 7467-7477.
Zitnick, C., et al., "High-quality video view interpolation using a layered representation", ACM SIGGRAPH, 2004, 9 pages.
Zhang, R., et al., "The Unreasonable Effectiveness of Deep Features as a Perceptual Metric", Proc. CVPR, 2018, pp. 586-595.

(56) References Cited

OTHER PUBLICATIONS

Andersson, P., et al., "FLIP: A Difference Evaluator for Alternating Images", Proc. ACM Comput. Graph. Interact. Tech., vol. 3, No. 2, Article 15, Aug. 2020, pp. 15:1-15:23.

* cited by examiner

METHOD OF GENERATING MULTI-LAYER REPRESENTATION OF SCENE AND COMPUTING DEVICE IMPLEMENTING THE SAME

CROSS-REFERENCE TO RELATED APPLICATION(S)

This application is a bypass continuation of International Application No. PCT/KR2022/003655, filed on Mar. 16, 2022, which is based on and claims priority to Russian Patent Application No. 2021106881, filed on Mar. 16, 2021, and Russian Patent Application No. 2021121536, filed on Jul. 20, 2022, in the Russian Intellectual Property Office, the disclosures of which are incorporated by reference herein in their entireties.

BACKGROUND

1. Field

The present disclosure relates to the field of artificial intelligence (AI) and neural rendering, and particularly to a method of generating a multi-layer representation of a scene using neural networks trained in an end-to-end fashion and to a computing device implementing the method. The multi-layer representation of the scene may be used for synthesizing a novel view for the scene.

2. Description of the Related Art

Recent years have seen a rapid progress in image-based rendering and the novel view synthesis, with a multitude of diverse methods based on neural rendering approaches. Among this diversity, the approaches that are based on semi-transparent multi-layered representations stand out due to their combination of fast rendering time, compatibility with traditional graphics engines, and good quality of re-rendering in the vicinity of input frames.

Existing approaches build multi-layer representations over the grids of regularly spaced surfaces such as planes or spheres with uniformly changing inverse depth. As the number of layers is necessarily limited by resource constraints and overfitting, this number is usually taken to be relatively small (e.g. 32). The resulting semi-transparent representation may therefore only coarsely approximate the true geometry of the scene, which limits the generalization to novel views and introduces artefacts. The recent works in the filed use excessive number of spheres (up to 128) and then merge the resulting geometry using non-learned post-processing merging step (see FIG. 1A). While the merge step creates scene-adapted and compact geometric representation, it is not incorporated into the learning process of the main matching network, and degrades the quality of new view synthesis.

The coarseness of layered geometry used by multilayer approaches is in contrast to more traditional image-based rendering methods that start by estimating the non-discretized scene geometry in the form of mesh, view-dependent meshes, a single-layer depth map. The geometry estimates may come from multi-view dense stereo matching or from monocular depth. All these approaches obtain a finer approximation to scene geometry, though most of them have to use a relatively slow neural rendering step to compensate for the errors in the geometry estimation.

SUMMARY

The method according the embodiment of the present disclosure (as schematically illustrated on FIG. 1B) starts by building a geometric proxy that is customized to a particular scene. The geometric proxy is formed by a small number of mesh layers with continuous depth coordinate values. In the second stage, the transparency and the color textures are estimated for each layer resulting in the final representation of the scene. When processing a new scene, both stages take the same pair of images of that scene as an input. Two deep neural networks pretrained on a dataset of similar scenes are used to implement the two stages. Crucially, both neural networks are trained together (jointly) in the end-to-end fashion using the differentiable rendering framework.

An embodiment of the present disclosure is compared to the previously proposed methods that use regularly spaced layers on the popular RealEstate10 k and LLFF datasets. In both cases, the use of scene-adaptive geometry as in the present embodiment results in improved synthesis accuracy for a novel view of the scene. In other words, the present embodiment achieves better novel view synthesis quality.

To sum up, the contributions of the present application over prior art are as follows:

A new method for geometric scene reconstruction from a pair of images (e.g. a stereopair) is proposed. The method uses a representation based on scene adaptive multiple semitransparent layers from the pair of images.

Unlike other methods, the method proposed herein uses two jointly (end-to-end) trained deep neural networks, the first of which predicting a layered structure of a scene (i.e. a geometry of layers), while the second estimates color values and opacity $\alpha$ values (i.e. transparency) for the predicted layered structure of the scene.

The present embodiment is evaluated on a previously proposed dataset, and additionally on a new challenging dataset for training and evaluating novel view synthesis methods.

According to an aspect of the present application, there is provided a method of generating a multi-layer representation of a scene, the method including: obtaining a pair of images of the scene, the pair of the images including a reference image and a source image; performing a reprojection operation on the pair of images to generate a plane-sweep volume; predicting, using a geometry network, a layered structure of the scene based on the plane-sweep volume; and estimating, using a coloring network, color values and opacity values for the predicted layered structure of the scene to obtain the multi-layer representation of the scene; wherein the geometry network and the coloring network are trained in end-to-end manner.

The method may further include: receiving input information defining a camera pose for a new view of the scene; reprojecting layers of the multi-layer representation of the scene according to the camera pose; and composing the reprojected layers of the multi-layer representation of the scene in back-to-front order using a compose-over operator to synthesize an image with the new view of the scene.

The pair of images is a pair of stereo images, and a camera pose of the source image to the reference image and intrinsic parameters of a camera, with which the pair of stereo images is captured, are a priori.

The predicting the layered structure may include: predicting the layered structure using the geometry network, in a camera frustum of the reference image.

The performing the reprojection operation may include: placing P fronto-parallel planes to be uniformly spaced from each other in an inverse depth space of a camera frustum of the reference image, wherein P is a natural number; reprojecting the source image onto the P fronto-parallel planes; sampling the reprojections at W×W resolution, wherein W is a positive integer; and concatenating the source image as an additional set of three channels to the sampled reprojections, which results in the plane-sweep volume that is in a form of W×W×(3P+3)-sized tensor.

The layered structure of the scene may include L layers, each layer of the L layers is defined by w×w depth map corresponding to a depth along a w×w pencil of rays uniformly spaced in a coordinate space of the reference image, wherein the predicted layered structure of the scene may be a w×w×L tensor encoding a geometry of all L layers, and wherein L and w may be natural numbers.

The layers L of the predicted layered structure may be reordered according to a decreasing average depth.

The method may further include: reprojecting the source image onto each of L layers of the predicted layered structure of the scene; sampling the reprojections at W×W resolution; and concatenating the reference image as an additional set of three channels to the sampled reprojections, which results in W×W×(3L+3)-sized tensor; wherein the estimating the color values and the opacity values may include: processing the W×W×(3L+3)-sized tensor, using the coloring network, to obtain in W×W×4L-sized tensor including the estimated color values and the estimated opacity values at each of the W×W positions and at each of the L layers, wherein L is a natural number and W may be a positive integer.

The geometry network and the coloring network may be trained based on a training dataset of short videos of static scenes, for which camera pose sequences are estimated using Structure from Motion (SfM) technique.

The geometry network and the coloring network may be trained in the end-to-end manner by minimizing a weighted combination of one or more of an image-based perceptual loss, an adversarial loss, a geometric loss, a total variation (TV) loss, and a feature matching loss.

The method may further include computing the image-based perceptual loss at one or more training iterations, wherein the computing the image-based perceptual loss may include: sampling a triplet $(I_s; I_r; I_n)$ of images including a source training image, a reference training image, and a hold-out training image of a scene from a training video of the training dataset, wherein $I_s$, $I_r$, and $I_n$ denote the source training image, the reference training image, and the hold-out training image, respectively; performing the reprojection operation on the source training image and the reference training image to generate a plane-sweep volume; predicting, using the to-be-trained geometry network, a layered structure of the scene of the training video based on the plane-sweep volume; estimating, using the to-be-trained coloring network, color values and opacity values of the training video for the predicted layered structure of the scene of the training video; generating a multi-layer representation of the scene of the training video based on the predicted layered structure of the scene and the estimated color values and opacity values of the training video; synthesizing an image with a new view of the scene of the training video by reprojecting layers of the multi-layer representation of the scene according to a camera pose, with which the hold-out training image is captured; computing the image-based perceptual loss between the synthesized image and the holdout image; and backpropagating the computed image-based perceptual loss through the geometry network and the coloring network.

The method may further include computing the adversarial loss at one or more training iterations, wherein the computing the adversarial loss may include: sampling a triplet $(I_s; I_r; I_n)$ of images including a source training image, a reference training image, and a hold-out training image of a scene from a training video of the training dataset, wherein $I_s$, $I_r$, and $I_n$ denote the source training image, the reference training image, and the hold-out training image, respectively; performing the reprojection operation on the source training image and the reference training image to generate a plane-sweep volume; predicting, using the to-be-trained geometry network, a layered structure of the scene of the training video based on the plane-sweep volume; estimating, using the to-be-trained coloring network, color values and opacity values of the training video for the predicted layered structure of the scene of the training video; generating a multi-layer representation of the scene of the training video based on the predicted layered structure of the scene and the estimated color values and opacity values of the training video; synthesizing an image with a new view of the scene by reprojecting layers of the multi-layer representation of the scene according to a camera pose, with which the hold-out training image is captured; processing, using a to-be-trained discriminator network, the synthesized image to compute a synthesized score of the synthesized image; processing, using the to-be-trained discriminator network, the hold-out training image to compute a real score of the hold-out training image; computing the adversarial loss as a minimax loss between the synthesized score and the real score; and backpropagating the computed adversarial loss through the to-be-trained geometry network, the to-be-trained coloring network, and the to-be-trained discriminator network.

The method may further include computing the geometric loss at one or more training iterations, the computing the geometric loss may include: sampling a triplet $(I_s; I_r; I_n)$ of images including a source training image, a reference training image, and a hold-out training image of a scene from a training video of the training dataset, wherein $I_s$, $I_r$, and $I_n$ denote the source training image, the reference training image, and the hold-out training image, respectively; performing the reprojection operation on the source training image and the reference training image to generate a plane-sweep volume; predicting, using the to-be-trained geometry network, a layered structure of the scene of the training video based on the plane-sweep volume; computing the geometric loss between the predicted layered structure and a real sparse point cloud corresponding to the scene in the hold-out training image, the real sparse point cloud being estimated using Structure from Motion (SfM) technique; and backpropagating the computed geometric loss through the to-be-trained geometry network $F_g$.

The method may further include computing the TV loss at one or more training iterations, wherein the computing the TV loss may include: sampling a triplet $(I_s; I_r; I_n)$ of images comprising a source training image, a reference training image, and a hold-out training image of a scene from a training video of the training dataset, wherein $I_s$, $I_r$, and $I_n$ denote the source training image, the reference training image, and the hold-out training image, respectively; performing the reprojection operation on the source training image and the reference training image to generate a plane-sweep volume; predicting, using the to-be-trained geometry network, a layered structure of the scene of the training video based on the plane-sweep volume; computing a total variation for each layer in the predicted layered structure and an averaged variation across the layers of the predicted layered structure as the TV loss; and backpropagating the computed TV loss through the to-be-trained geometry network.

According to another aspect of the present application, there is provided a non-transitory computer-readable storage medium storing a program that is executable by a computer to perform a method of generating a multi-layer representation of a scene, the method including: obtaining a pair of images of the scene, the pair of the images including a reference image and a source image; performing a reprojection operation on the pair of images to generate a plane-sweep volume; predicting, using a geometry network, a layered structure of the scene based on the plane-sweep volume; and estimating, using a coloring network, color values and opacity values for the predicted layered structure of the scene to obtain the multi-layer representation of the scene.

Thus, unlike most previous works on multilayer semi-transparent representations, the pipeline disclosed in the present application starts with curved (non-planar, non-spherical) layer prediction and only then estimates color and opacity values of the layers. While the related art may also be considered as ending up with curved semi-transparent layers as a representation, the reconstruction is performed in the opposite order (the geometry is predicted first) according to an embodiment of the present disclosure. More importantly, unlike the related art, the geometry of layers is predicted in the present embodiment using a neural network, and this network is trained jointly with the other coloring network. End-to-end training ensures that layers of the multilayer semi-transparent representations are adaptive and depending on submitted pair of images. In the related art, layers are obtained according to a certain algorithm—a heuristic that is universal and may not fit a scene. In the present application, the task of predicting a geometry and colors of a scene is performed by the neural networks as a whole, thereby advantageously removing any manual manipulations with the geometry. The main differences between the present embodiment and previous multi-layer approaches are illustrated in FIG. 1A. It should however be noted that the differences briefly touched upon in the present paragraph are not the only differences between the present embodiment and the related art.

BRIEF DESCRIPTION OF THE DRAWINGS

The above and/or other aspects will be more apparent by describing certain example embodiments, with reference to the accompanying drawings, in which.

DETAILED DESCRIPTION

Figure 4:
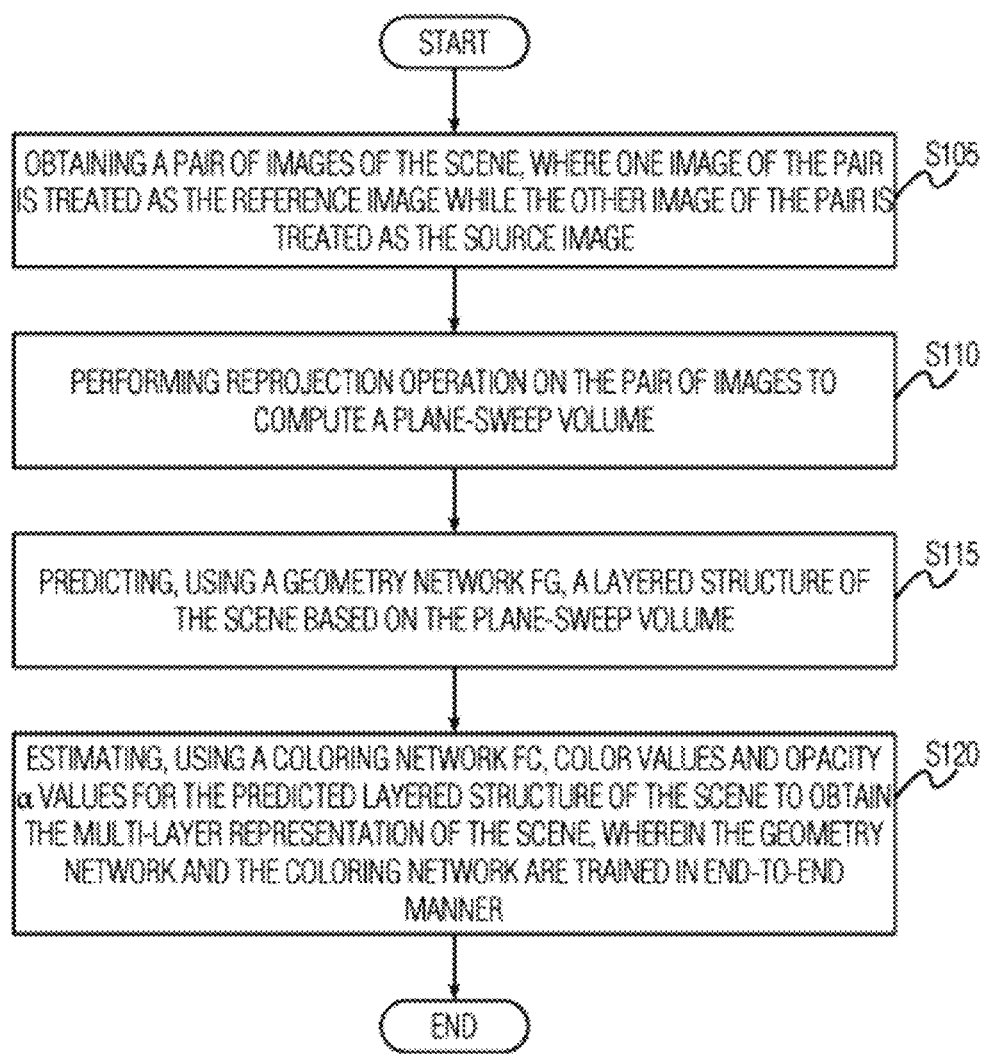
FIG. 4 illustrates a method of generating a multi-layer representation of a scene according to an embodiment of the present disclosure.

The in-use (inference) stage of the proposed method will be described first, and then the stage of training the neural networks and other details and implementations will be described. FIG. 4 illustrates a method of generating a multi-layer representation of a scene according to an embodiment of the present disclosure. The method starts from the step S105 of obtaining a pair of images of the scene. The pair of images may be, but without the limitation, the stereopair. Alternatively, the pair of images may be, but without the limitation, images of a same scene shot from different angles. Any one of the images of the pair is treated as a reference image $I_r$ and the other one of the images of the pair is treated as a source image $I_s$. The reference image $I_r$ and the source image $I_s$ may alternatively be referred to as reference view and the source view, respectively. It is assumed that the relative camera pose $\pi_s$ of the source image to the reference image and the intrinsic parameters $K_r$ and $K_s$ of the camera, with which the stereopair is captured, are known a priori, e.g. predetermined.

The images may be captured by any camera, for example, but without the limitation, an ordinary digital camera, a stereo camera, 3D camera, a stereo rig and so on, which can be standalone equipment or be a part of an electronic computing device, such as, for example, smartphone. Alternatively, if the permission to access a storage of an electronic computing device is get from a user of the device, a pair of images may be obtained from images stored in the storage or sampled from a video stored in the storage as two close or adjacent frames of the video.

Figure 5:
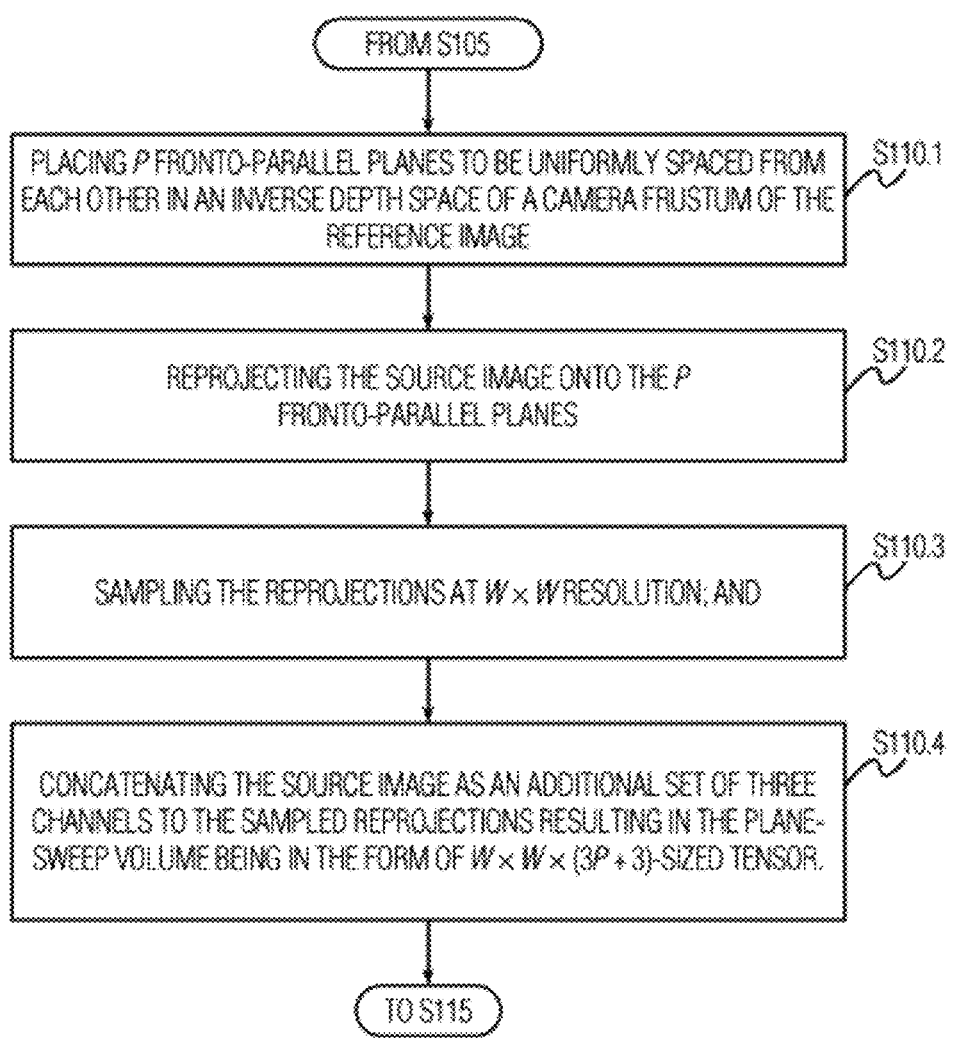
FIG. 5 illustrates details of a step of performing reprojection operation on the pair of images to generate a plane-sweep volume according to an embodiment of the present disclosure, the step is comprised in the method illustrated on FIG. 4.

Then the method goes to the step S110 of performing reprojection operation on the pair of images to generate a plane-sweep volume (a tensor obtained by the "reprojection" operation). Details of the step are explained with reference to FIG. 5. The step S110 starts from the substep S110.1 of placing P fronto-parallel planes to be uniformly spaced from each other in an inverse depth space of a camera frustum of the reference image, wherein P is a natural number. "Fronto-parallel planes" mean planes substantially parallel to a plane of an image captured by the camera and located in front of the camera, possibly at different distances from the camera. Then the step S110 goes to the substep S110.2 of reprojecting the source image onto the P fronto-parallel planes. Simply put, at this step, an assessment is made of what pixels would be visible if the scene was observed from a different position defined by new coordinates. Then the step S110 goes to the substep S110.3 of sampling the reprojections at W×W resolution. This step may be omitted if the resolution of the reprojection obtained at the previous step is already equal to W×W. Finally, the step S110 goes to the substep S110.4 of concatenating the source image as an additional set of three channels to the sampled reprojections resulting in the plane-sweep volume being in the form of W×W×(3P+3)-sized tensor.

Now returning back to the description of FIG. 4. After the step S110, the method goes to the step S115 of predicting, using a geometry network $F_g$, a layered structure of the scene based on the plane-sweep volume. The layered structure of the scene defines a geometry of L layers of the scene. The layered structure is predicted at S115 by the geometry network $F_g$ in a camera frustum of the reference image. The architecture of the geometry network $F_g$ is similar to the depth prediction network of SynSin, but with a greater number of input and output featuremaps. Therefore, we may say that the pair of images is treated asymmetrically, as the layered structure is predicted in the frustum of the reference camera, i.e. the camera used to capture the reference image. The layered structure of the scene comprises L layers, each layer of the L layers is defined by w×w depth map corresponding to the depth along the w×w pencil of rays uniformly spaced in the coordinate space of the reference image. Thus, such parametrization allows getting non-planar structure of the layers of the layered structure. Therefore, the predicted layered structure of the scene is a w×w×L tensor encoding the geometry of all L layers, wherein w is a positive integer.

Figure 1A:
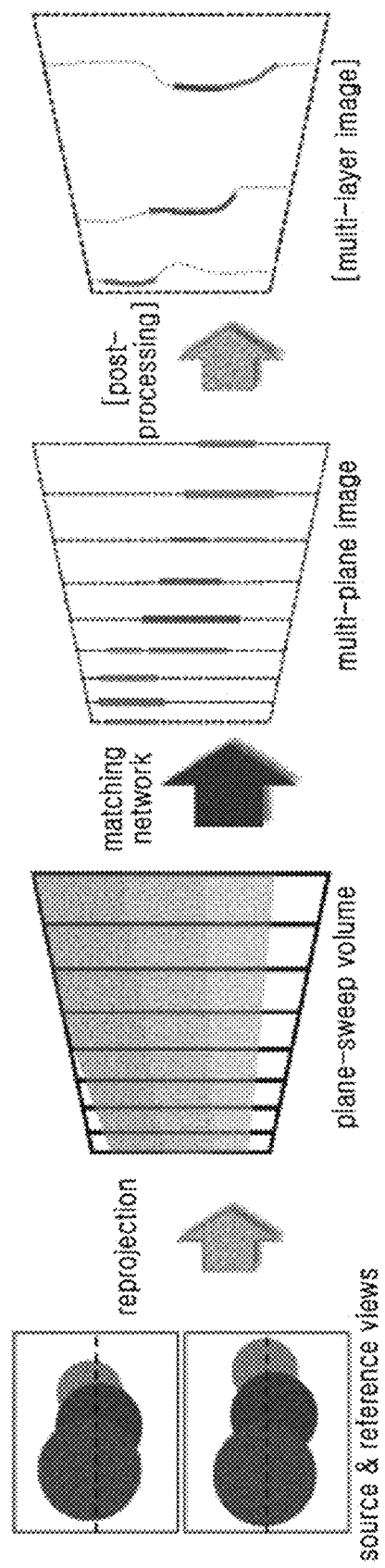
FIG. 1A illustrates the processing pipeline in the related art.
Figure 1B:
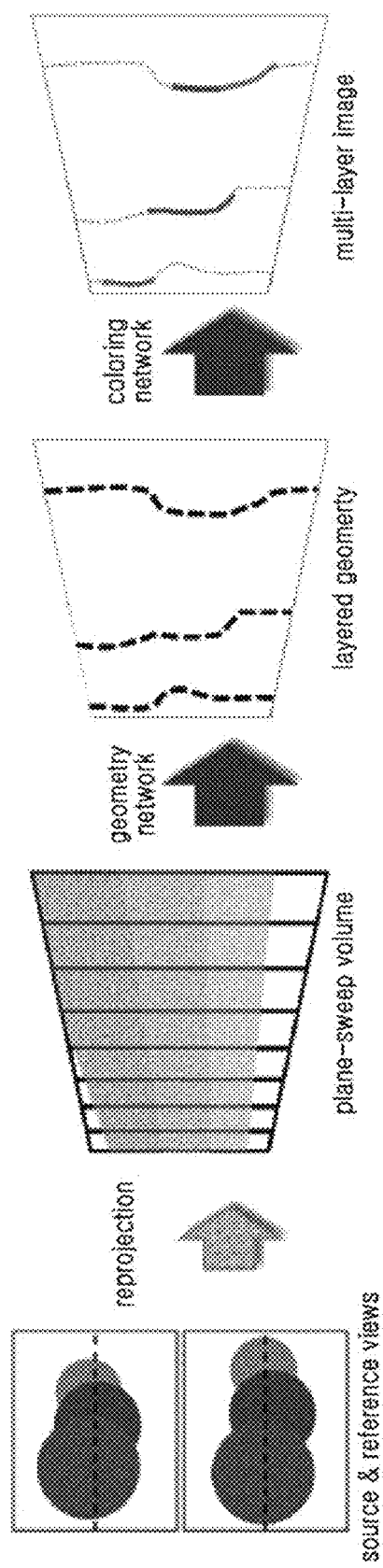
FIG. 1B schematically illustrates the processing pipeline according to an embodiment of the present disclosure.
Figure 2:
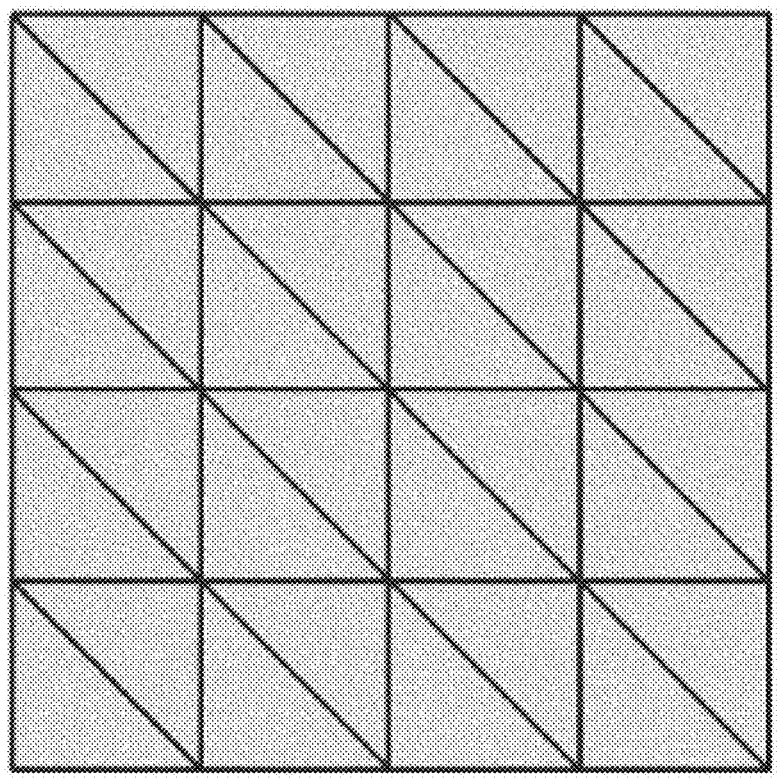
FIG. 2 illustrates a non-limiting embodiment of a mesh layer pattern that can be used to represent each layer of the predicted layered structure of the scene according to an embodiment of the present disclosure.

Each of the predicted layers is treated as a mesh by connecting each vertex with the nearby six nodes. The resulting L meshes (also may be referred to as "the layered mesh") thus represent the scene geometry. In general, a number of mesh layers L may be smaller than a number of the original depth planes P, resulting in a more compact and scene-adapted representation. As a non-limiting example L may be equal to e.g. 4 and P may be equal to e.g. 8. However, the case where P=L=e.g. 8 may be possible as well. FIG. 2 illustrates a non-limiting embodiment of a mesh layer pattern that can be used to represent each layer of the predicted layered structure of the scene. Each pixel represents a mesh vertex (a point of intersection of lines on the figure), connected with its six neighbors (up and down, left and right, and two neighbors on the diagonal). The method may also comprise the steps (not illustrated) of reordering the layers L of the predicted layered structure according to the decreasing average depth, reprojecting the source image onto each of the L layers of the predicted layered structure of the scene, sampling the reprojections at W×W resolution, and concatenating the reference image as an additional set of three channels to the sampled reprojections, which results in W×W×(3L+3)-sized tensor representing the predicted layered structure. The renderer from PyTorch3D may be used to make said reprojection operations differentiable with respect to the layered mesh geometry. Here, L is a natural number, and W is a positive integer.

Finally, after the step S115, the method goes to the step S120 of estimating, using a coloring network $F_c$, color values and opacity α values for the predicted layered structure of the scene to obtain the multi-layer representation of the scene. Opacity α values are used as weighting coefficients for Compose-Over operator that is applied to synthesize a novel view for the multilayer representation. To perform the estimation at the step S120 the W×W×(3L+3)-sized tensor is processed, using the coloring network $F_c$, which results in W×W×4L-sized tensor comprising estimated color values and opacity α values at each of the W×W positions and at each of the L layers. Estimated color values and opacity α values at each of the W×W positions and at each of the L layers of the predicted layered structure represent the multi-layer representation. Non-planar layers are used when performing the estimation. The geometry network $F_g$, used at the step S115 and the coloring network $F_c$ used at the step S120 are trained jointly (i.e. in end-to-end manner) in advance to the in-use (inference) stage of the proposed method as described above. End-to-end training of the geometry network $F_g$ and the coloring network $F_c$ will be described below in details.

Figure 12:
FIG. 12 illustrates examples of novel views (view extrapolations) synthesized for the input images (in the middle column) using the method illustrated on FIG. 4.

Once the multi-layer representation of the scene is obtained, it may be used for synthesizing novel view(s) of the scene with improved synthesis accuracy. To implement this functionality the method may further comprise the following steps (not illustrated): receiving input information defining a desired camera pose for a novel view of the scene, reprojecting layers of the multi-layer representation of the scene according to the desired camera pose, and composing the reprojected layers of the multi-layer representation of the scene in back-to-front order using compose-over operator to synthesize an image with the novel view of the scene. The input information comprises camera parameters including translation and rotation parameters defining a desired camera pose for a novel view of the scene. Certain examples of novel views (view extrapolations) synthesized for the input images (in the middle column) using the method illustrated on FIG. 4 are shown on FIG. 12. In the illustrated examples, the baseline is magnified by a factor of 5×. In a non-limiting embodiment, a user may input the information defining a desired camera pose for a novel view of the scene via a touch input, e.g. a user may swipe up, down, left or right the electronic computing device screen displaying an image of a scene to synthesize scene novel views rotated in corresponding directions around a center of the scene. Alternatively, a user may input a position and a direction of the camera for novel view synthesis directly in a coordinate space.

End-to-end training of the geometry network $F_g$ and the coloring network $F_c$ will be described now. The geometry network $F_g$ and the coloring network $F_c$ may be trained based on a training dataset of short videos of static scenes, for which camera pose sequences are estimated using Structure from Motion (SfM) technique. The geometry network $F_g$ and the coloring network $F_c$ are trained in end-to-end manner by minimizing a weighted combination of one or more of the following losses: image-based perceptual loss, adversarial loss, geometric loss, and total variation (TV) loss.

Image-based perceptual loss. The image-based perceptual loss is the main training loss that comes from the image supervision. For example, at a training iteration, the image triplet ($I_s$; $I_r$; $I_n$) containing the source view $I_s$, the reference view $I_r$, and the novel (hold-out) view $I_n$ from a training video. Given the current network parameters (before the start of the training parameters/weights of the geometry network $F_g$ and the coloring network $F_c$ may be initialized, e.g. randomly), the scene geometry and the textures are estimated from ($I_s$; $I_r$) and then the resulting representation is reprojected onto the $I_n$ resulting in the predicted image $\hat{I}_n$. Then the perceptual loss [14] between $I_n$ and $\hat{I}_n$ and backpropagated through the geometry network $F_g$ and the coloring network $F_c$.

Figure 6:
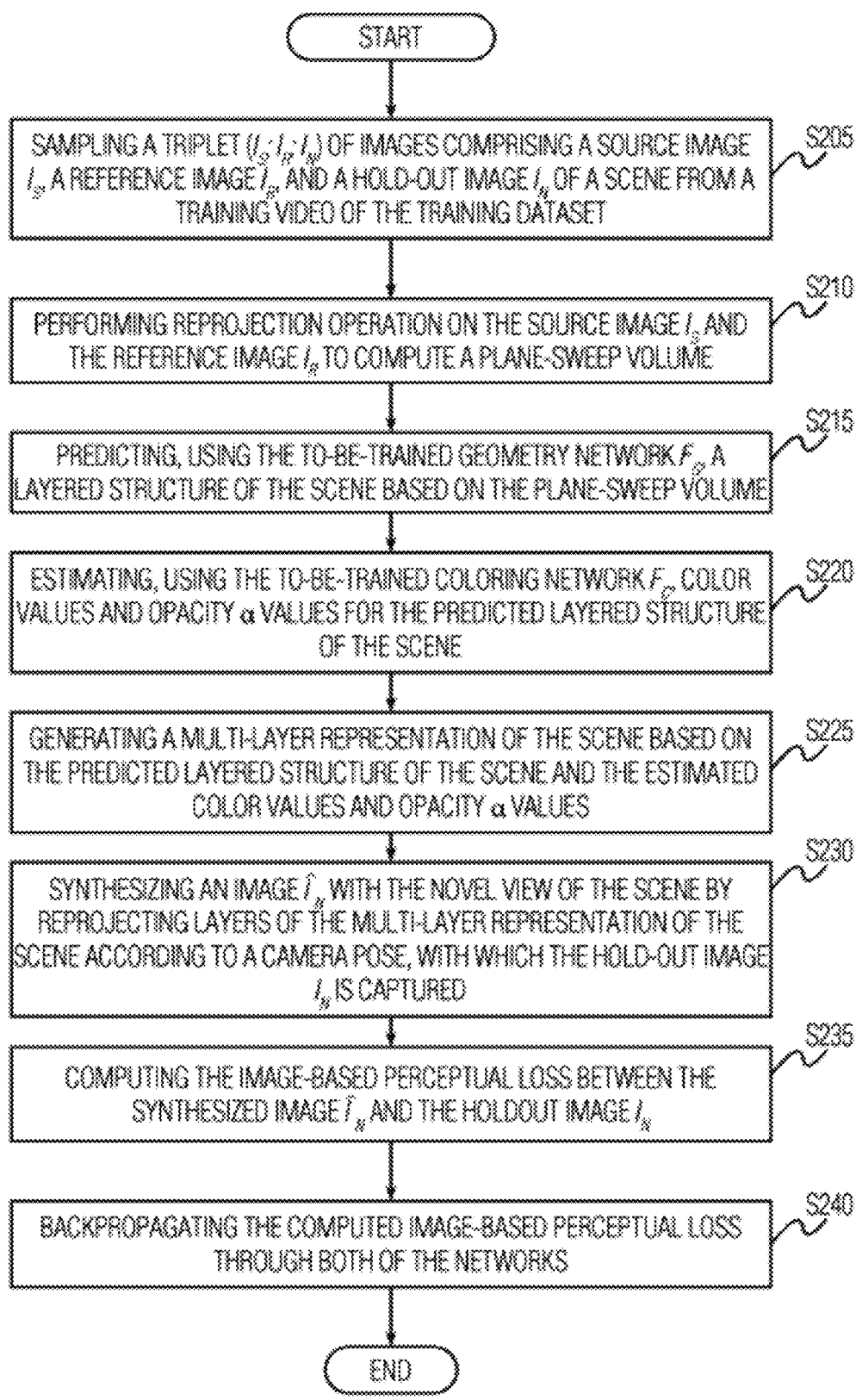
FIG. 6 illustrates details of a step of computing and backpropagating the image-based perceptual loss at a stage of training a geometry network and a coloring network according to an embodiment of the present disclosure.

FIG. 6 illustrates details of a step of computing and backpropagating the image-based perceptual loss at a stage of training a geometry network and a coloring network according to an embodiment of the present disclosure. The step of computing the image-based perceptual loss at one or more training iterations starts from the step S205 of sampling a triplet ($I_s$; $I_r$; $I_n$) of images comprising a source image $I_s$, a reference image $I_r$, and a hold-out image $I_n$ of a scene from a training video of the training dataset. Then the step of computing the image-based perceptual loss goes to the step S210 of performing reprojection operation on the source image $I_s$ and the reference image $I_r$ to generate a plane-sweep volume. Then said step goes to the step S215 of predicting, using the to-be-trained geometry network $F_g$, a layered structure of the scene based on the plane-sweep volume. Then said step goes to the step S220 of estimating, using the to-be-trained coloring network $F_c$, color values and opacity α values for the predicted layered structure of the scene. Then said step goes to the step S225 of generating a multi-layer representation of the scene based on the predicted layered structure of the scene and the estimated color values and opacity α values. The training steps S210, S215, S220, and S225 reproduce the in-use steps S110, S115, and S120 illustrated and described above with reference to FIG. 4. Then the step of computing the image-based perceptual loss goes to the step S230 of synthesizing an image $\hat{I}_n$ with the novel view of the scene by reprojecting layers of the multi-layer representation of the scene according to a camera pose, with which the hold-out image $I_n$ is captured. Finally, the step of computing the image-based perceptual loss goes to the step S235 of computing the image-based perceptual loss between the synthesized image $\hat{I}_n$ and the holdout image $I_n$ and to the step S240 of backpropagating the computed image-based perceptual loss through both of the networks.

Adversarial loss. Additionally, adversarial loss is imposed on the predicted images $\hat{I}_n$. The main goal of adversarial loss is to reduce unnatural artefacts such as ghosting and duplications. The adversarial loss is applied by training a discriminator network in parallel with the main networks: the geometry network $F_g$ and the coloring network $F_c$. To make adversarial learning more efficient, virtual views may be included into the learning. For example, during one or more iterations, a virtual view that is different from the view $I_n$ is computed, and the view $\hat{I}$ for that camera is predicted. This view is shown as a "fake" to the discriminator, and the gradients from the discriminator are used to obtain the parameters of the geometry network $F_g$ and the coloring network $F_c$. The use of virtual view reduces overfitting, and improves the generalization to views with uncharacteristic relative position with respect to the source and the reference views (in the training data, most triplets belong to a smooth camera trajectory).

Figure 7:
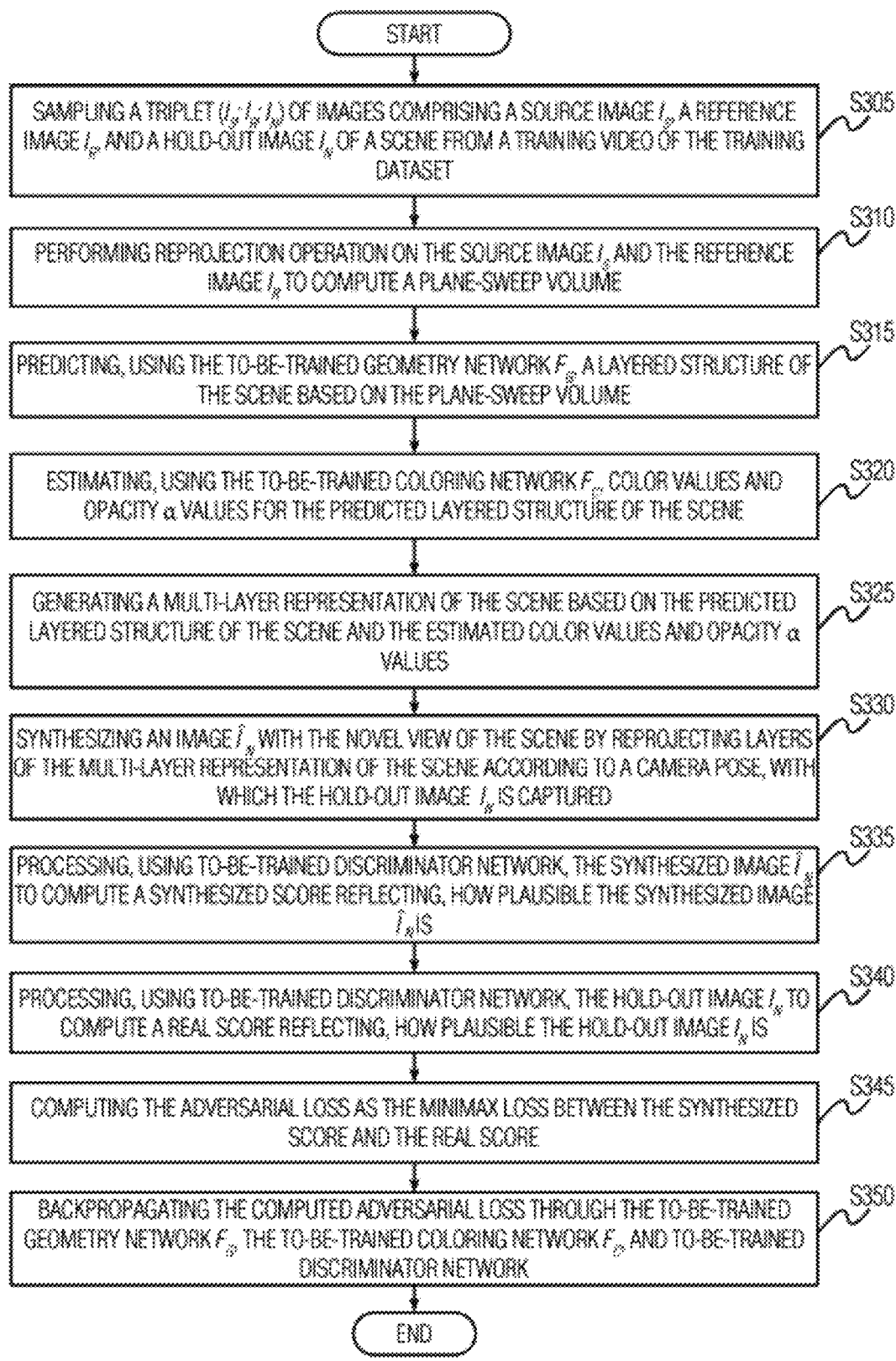
FIG. 7 illustrates details of a step of computing and backpropagating the adversarial loss at a stage of training a geometry network, a coloring network, and a discriminator network according to an embodiment of the present disclosure.

FIG. 7 illustrates details of a step of computing and backpropagating the adversarial loss at a stage of training a geometry network, a coloring network, and a discriminator network according to an embodiment of the present disclosure. The step of computing the adversarial loss at one or more training iterations starts from the step S305. Steps S305, S310, S315, S320, S325, S330 illustrated on FIG. 7 respectively correspond to the steps S205, S210, S215, S220, S225, S230 described above with reference to FIG. 6. Thus, the repeated descriptions of the steps S305, S310, S315, S320, S325, S330 are omitted here for brevity sake. After the step S330 the step of computing the adversarial loss goes to the step S335 of processing, using to-be-trained discriminator network, the synthesized image $\hat{I}_n$ to compute a synthesized score reflecting, how plausible the synthesized image $\hat{I}_n$ is, and to the step S340 of processing, using to-be-trained discriminator network, the hold-out image $I_n$ to compute a real score reflecting, how plausible the hold-out image $I_n$ is. Then, the adversarial loss is computed at the step S345 as the minimax loss between the synthesized score and the real score. Finally, the computed adversarial loss is backpropagated at the step S350 through the to-be-trained geometry network $F_g$, the to-be-trained coloring network $F_c$, and to-be-trained discriminator network.

Geometric loss. While the image-based loss can be used alone to train both networks, authors of the present disclosure found it beneficial to use the supervision from a sparse point cloud. Virtually any SfM approach produces a sparse point cloud in the process of the video sequence registration, so obtaining sparse point cloud comes at no extra cost. Particularly, it has been found that a geometric loss derived from such sparse point clouds can drive the learning, especially in its early stages. The geometric loss essentially demands that the predicted layers should cover the part of the point cloud that falls within the reference view frustum. Note that the geometric loss is computed based on the output of the geometry network $F_g$ and does not affect the coloring network $F_c$.

Figure 3:
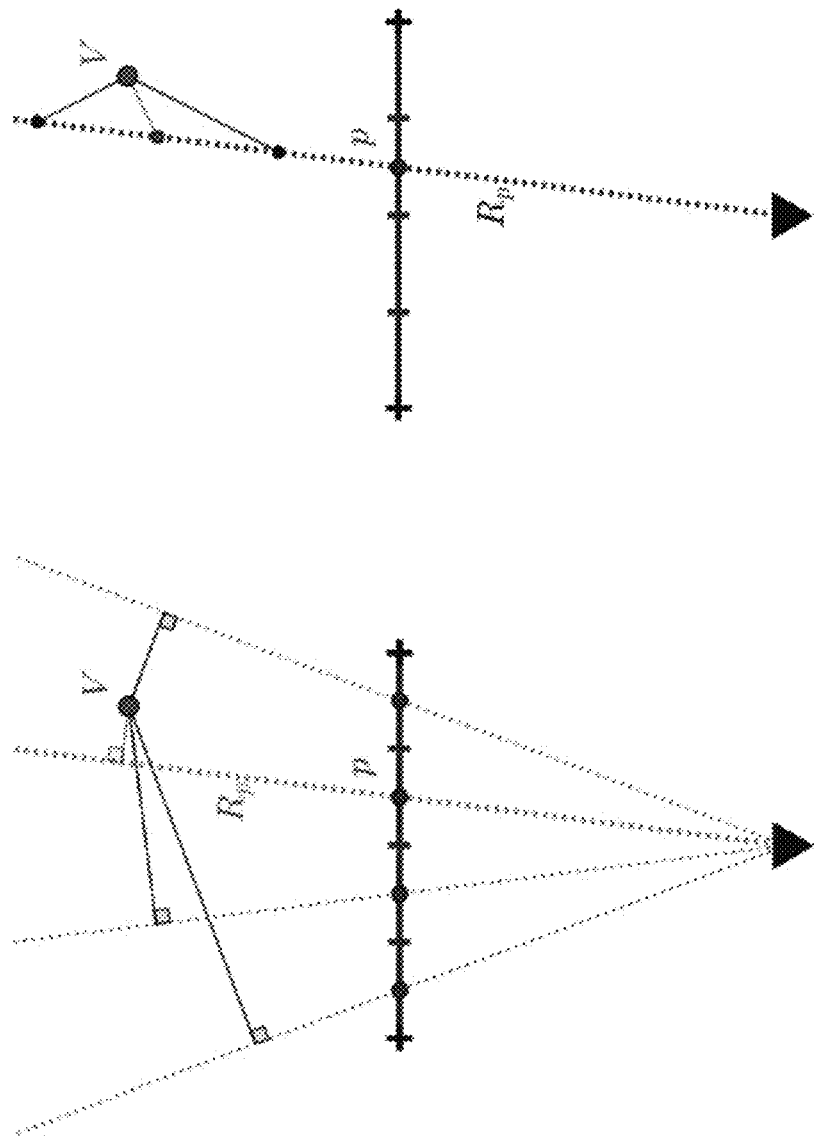
FIG. 3 illustrates calculation of geometric loss according to an embodiment of the present disclosure.

FIG. 3 exemplifies for visualization purposes, how the geometric loss is calculated according to an embodiment of the present disclosure. 2D case is illustrated. The resolution of layers geometry w is set to 4 and the number of layers L is set to 3. Step 1 (left on FIG. 3): For each point V of the guiding sparse point cloud, a nearest ray $R_p$ is determined taking its origin at the reference pinhole camera and passing through the center of the reference view pixel p. Step 2 (right on FIG. 3): the aim is to minimize the distance between V and the closest of L mesh vertices corresponding to the pixel p in the output of the geometry network. Alternatively, in certain embodiments, the nearest pixel position may be precomputed or the loss may be calculated with downsampled depth maps.

Figure 8:
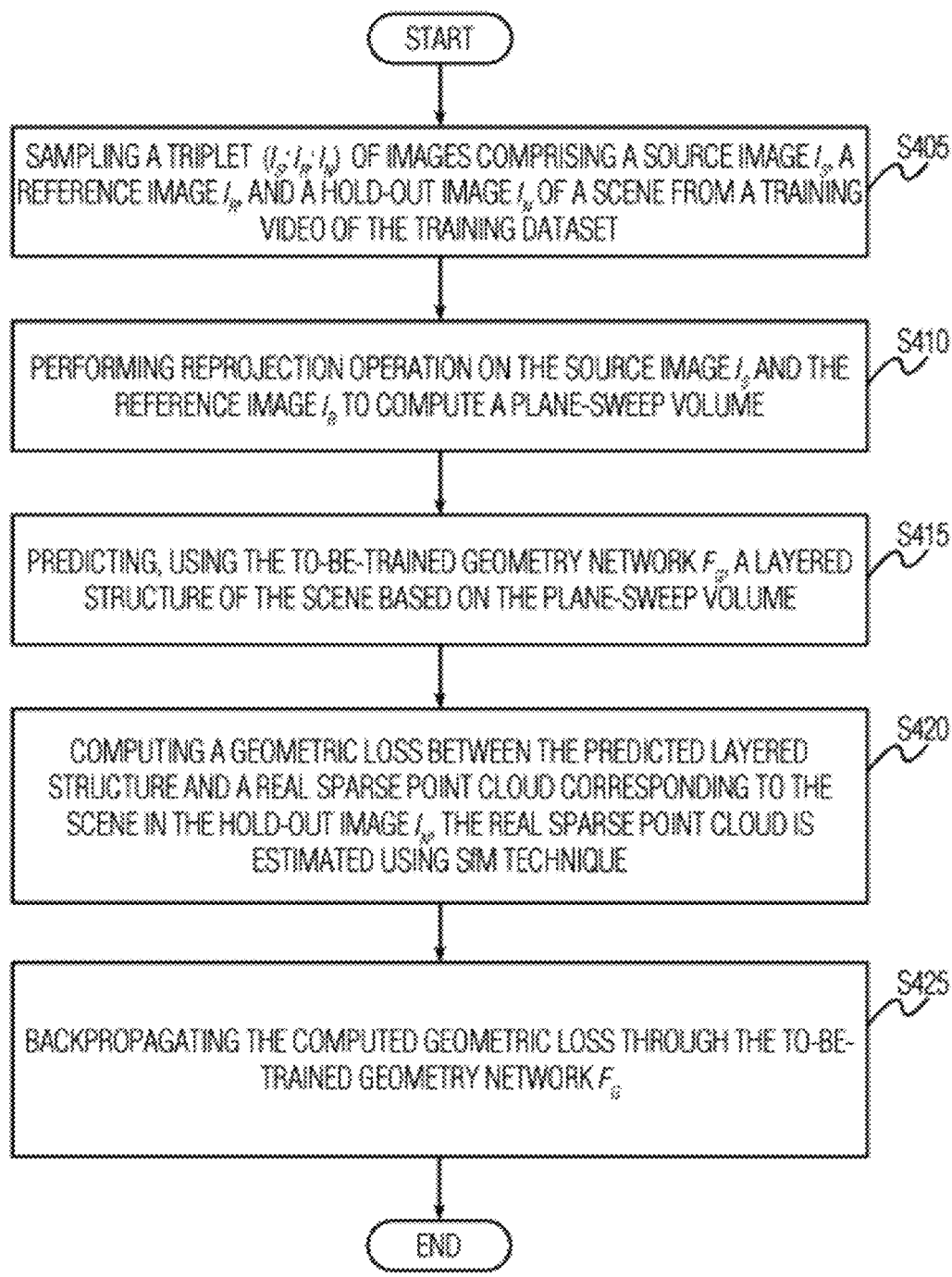
FIG. 8 illustrates details of a step of computing and backpropagating the geometric loss at a stage of training a geometry network according to an embodiment of the present disclosure.

FIG. 8 illustrates details of a step of computing and backpropagating the geometric loss at a stage of training a geometry network according to an embodiment of the present disclosure. The step of computing the geometric loss at one or more training iterations starts from the step S405. Steps S405, S410, S415 illustrated on FIG. 8 respectively correspond to the steps S205, S210, S215 described above with reference to FIG. 6. Thus, the repeated descriptions of the steps S405, S410, S415 are omitted here for brevity sake. After the step S415, the step of computing the geometric loss goes to the step S420 of computing a geometric loss between the predicted layered structure and a real sparse point cloud corresponding to the scene in the hold-out image $I_n$, the real sparse point cloud is estimated using SfM technique. Finally, the computed geometric loss is backpropagated at the step S425 through the to-be-trained geometry network $F_g$.

Figure 9:
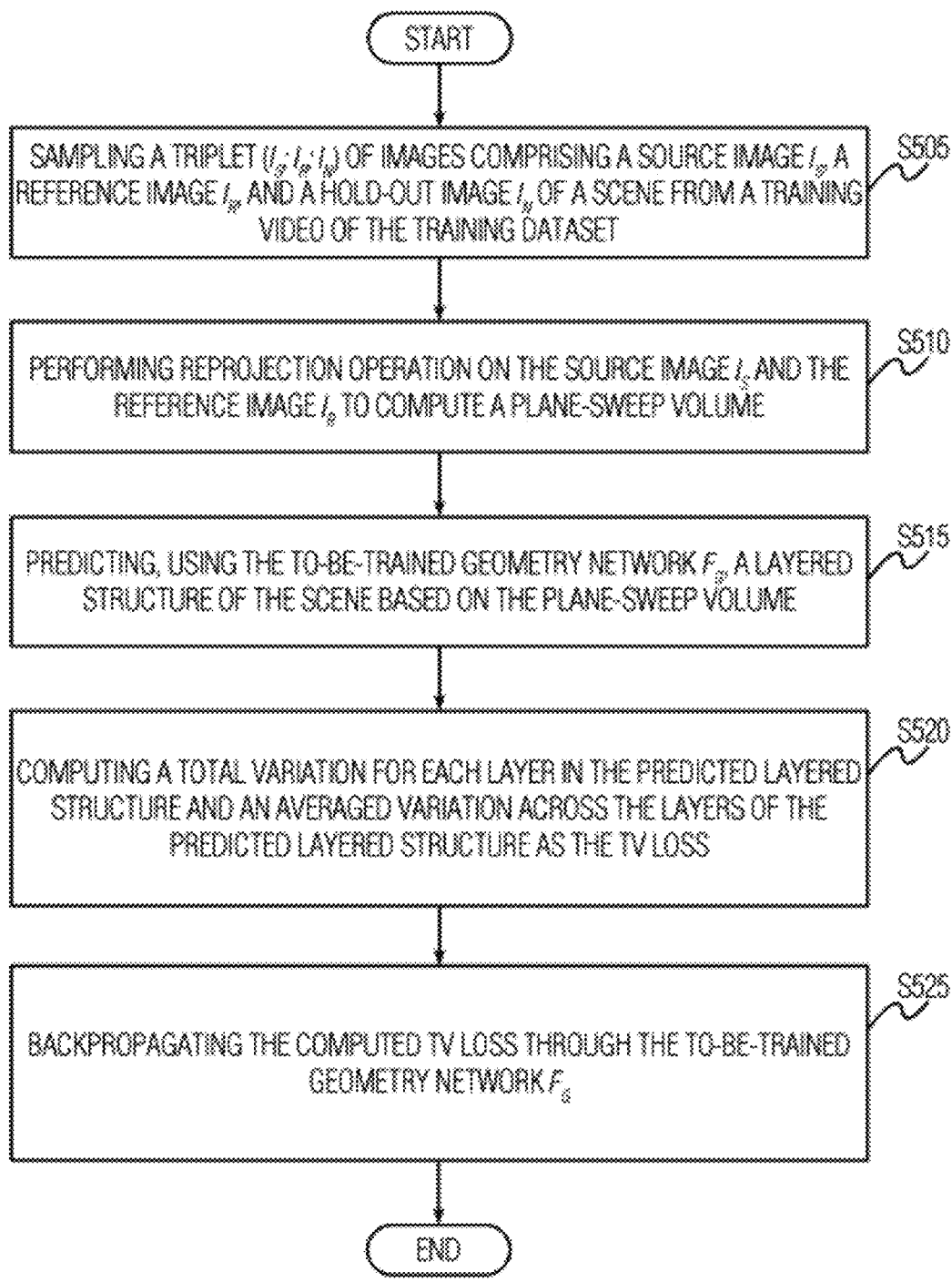
FIG. 9 illustrates details of a step of computing and backpropagating the total variation (TV) loss at a stage of training a geometry network according to an embodiment of the present disclosure.

Total variation (TV) loss. Additionally, the geometry of the layers may be regularized by imposing the TV loss on the depths of each layer (the total variation is computed for each of the w×w maps encoding the depths). FIG. 9 illustrates details of a step of computing and backpropagating the TV loss at a stage of training a geometry network according to an embodiment of the present disclosure. The step of computing the TV loss at one or more training iterations starts from the step S505. Steps S505, S510, S515 illustrated on FIG. 9 respectively correspond to the steps S205, S210, S215 described above with reference to FIG. 6. Thus, the repeated descriptions of the steps S505, S510, S515 are omitted here for brevity sake. After the step S515, the step of computing the TV loss goes to the step S520 of computing a total variation for each layer in the predicted layered structure and an averaged variation across the layers of the predicted layered structure as the TV loss. Finally, the computed TV loss is backpropagated at the step S525 through the to-be-trained geometry network $F_g$.

Figure 10:
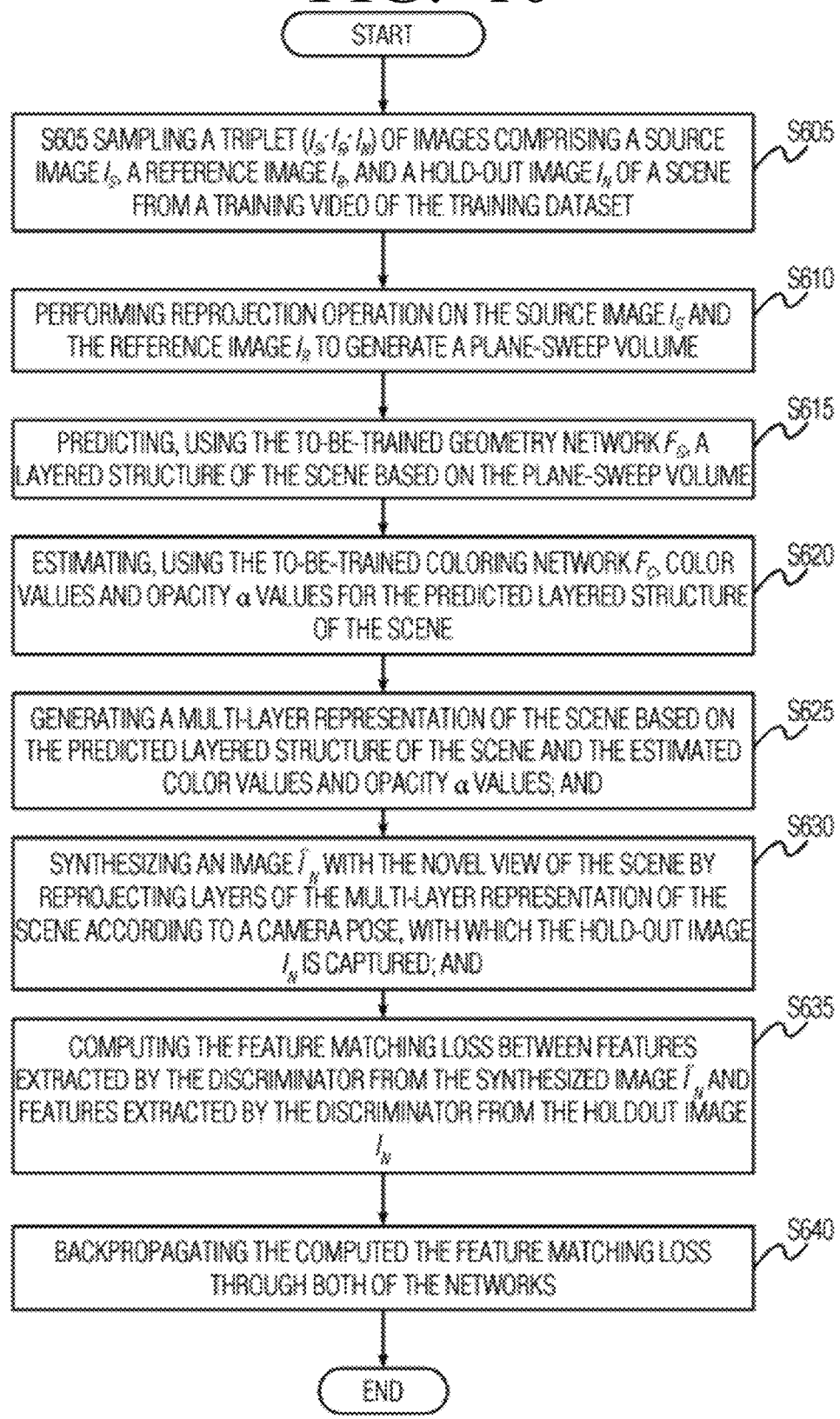
FIG. 10 illustrates details of a step of computing and backpropagating the feature matching loss at a stage of training a geometry network, a coloring network, and a discriminator network according to an embodiment of the present disclosure.

Feature matching loss. FIG. 10 illustrates details of a step of computing and backpropagating the feature matching loss at a stage of training a geometry network, a coloring network, and a discriminator network according to an embodiment of the present disclosure. The step of computing the feature matching loss at one or more training iterations starts from the step S605. Steps S605, S610, S615, S620, S625, S630, and S640 illustrated on FIG. 10 respectively correspond to the steps S205, S210, S215, S220, S225, S230, and S240 described above with reference to FIG. 6. Thus, the repeated descriptions of the steps S605, S610, S615, S620, S625, S630, and S640 are omitted here for brevity sake. After the step S630, the step of computing the feature matching loss goes to the step S635 of computing the feature matching loss between features extracted by the discriminator from the synthesized image $\hat{I}_n$ and features extracted by the discriminator from the holdout image $I_n$. Said features are pre-activated features (feature maps) corresponding at an output(s) of one or more convolutional block of the discriminator. Finally, the computed feature matching loss is backpropagated at the step S640 through both of the networks and, optionally, through the discriminator network.

Figure 11:
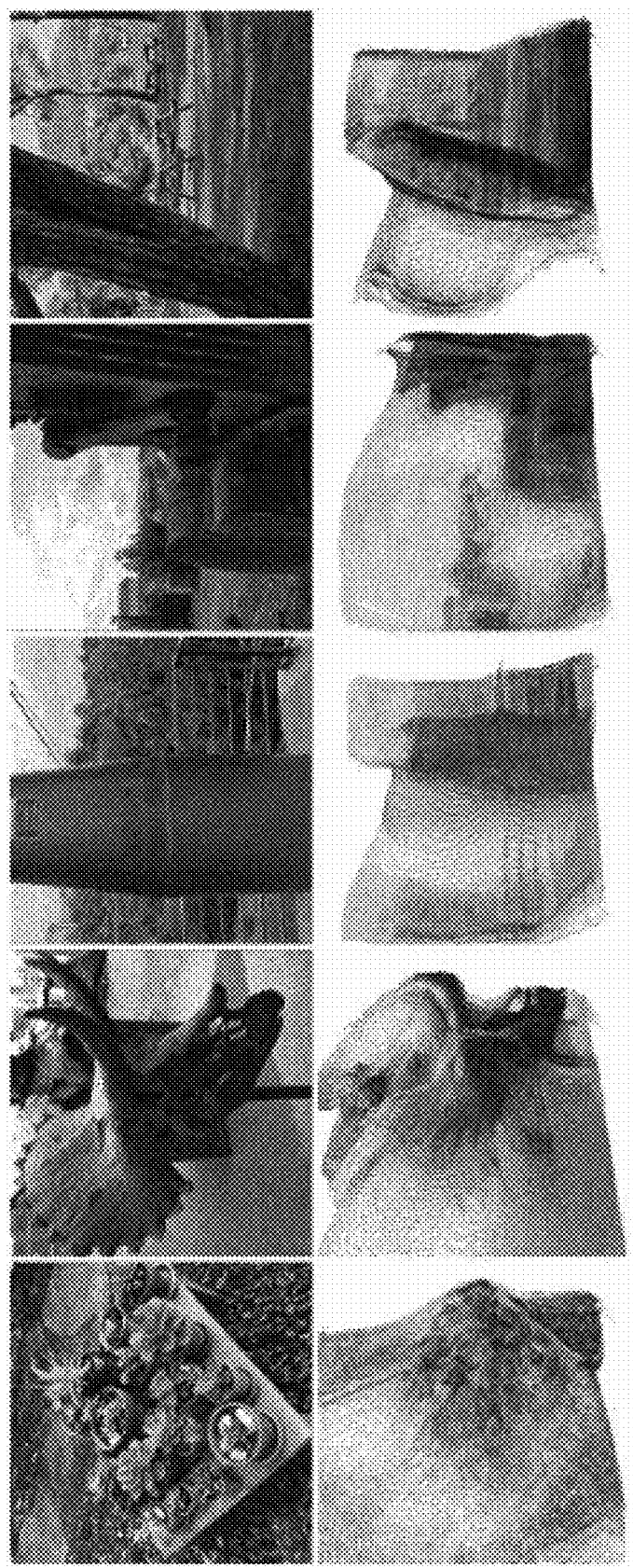
FIG. 11 illustrates examples of input images (top row) and corresponding point clouds (bottom row) from vertices of mesh layers of the layered structure predicted using geometry network according to an embodiment of the present disclosure.
Figure 13:
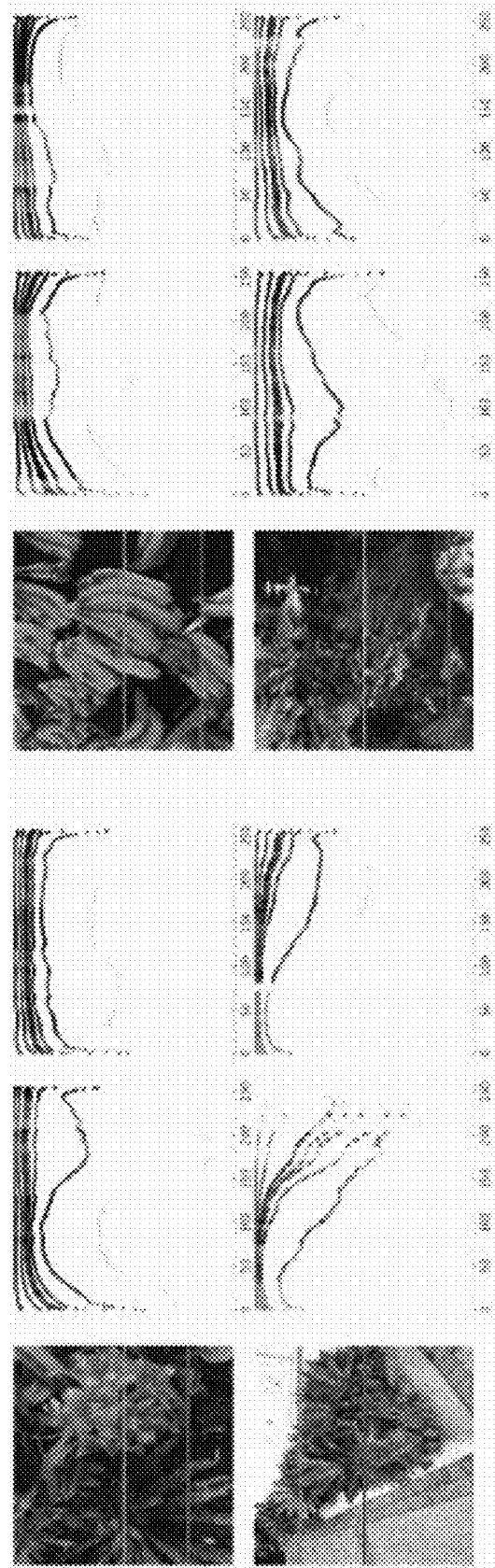
FIG. 13 illustrates slices along two lines of the four stereopairs (only reference images are shown); each mesh vertex is shown as a dot with its RGBA color.

FIG. 11 illustrates examples of input images (top row, from LLFF dataset and SWORD dataset compiled by authors of the present disclosure) and corresponding point clouds (bottom row) composed from vertices of mesh layers recovered by the disclosed method. The scenes are represented as multiple colored semi-transparent mesh layers. Points with opacity less than 0.5 are omitted for visualization purposes. FIG. 13 shows the real results of the method proposed herein, when the method has already evaluated both the geometry and the colors. Geometry is represented in curved lines that approximately follow the volume. More particularly, FIG. 13 illustrates slices along two lines of the four stereopairs (only reference images are shown); each mesh vertex is shown as a dot with its RGBA color. The horizontal axis corresponds to the pixel coordinate, while the vertical axis stands for the vertex depth with respect to the reference camera. The images demonstrate that both geometry and coloring networks participate in simulating the scene structure, by fitting the depth and opacity values to the input view pairs.

Figure 14:
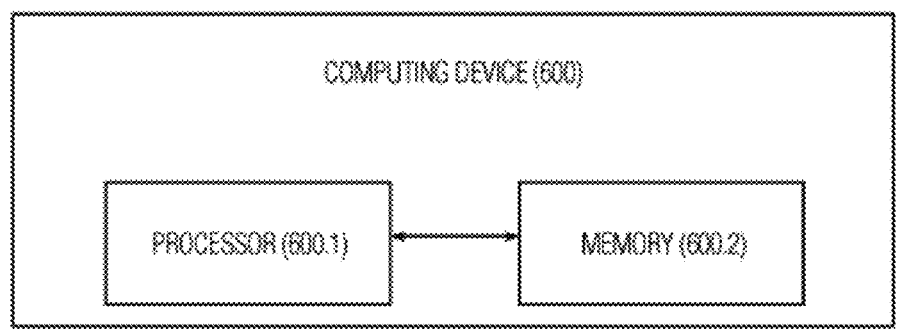
FIG. 14 schematically illustrates a computing device according to an embodiment of the present disclosure.

FIG. 14 schematically illustrates a computing device 600 according to an embodiment of the present disclosure. The computing device 600 comprises a processor 600.1 and a memory 600.2 storing processor-executable instructions that when executed by the processor cause the processor to perform any or all of the aspects of the method disclosed herein. The computing device 600 may be any user electronic device such as, for example, a smartphone, a tablet, a notebook, a smartwatch, PC as so on. The processor 600.1 is operatively coupled with the memory 600.2. The processor 600.1 may include one or a plurality of processors. The processor 600.1 may be a general-purpose processor, such as a central processing unit (CPU), a digital signal processor (DSP), an application processor (AP), or the like, a graphics-only processing unit such as a graphics-processing unit (GPU), a visual processing unit (VPU), and/or an AI-dedicated processor such as a neural processing unit (NPU). Such processors may be implemented as an application-specific integrated circuit (ASIC), a field-programmable gate array (FPGA), or a system-on-chip (SoC). The memory 600.2 may include the memory of any type, for example, random-access memory (RAM) and read-only memory (ROM). In addition to processor-executable instruction to execute any steps of the method proposed herein, the memory 600.2 may store to-be-processed images, as well as parameters and/or weights of the trained geometry network $F_g$, the trained coloring network $F_c$, and, if necessary, the discriminator network. Such computing devices may also comprise other components (not illustrated), for example, a (touch) screen, I/O means, a camera, a communication means, a battery, necessary interconnections between the components and the processor 600.1 and the memory 600.2, and so on, without limitation.

The proposed method may also be embodied on a computer-readable medium (not illustrated) having stored thereon processor-executable instructions that when executed by a processor of a computing device, cause the device to perform any step(s) of the proposed method. Any types of data made be processed by the intelligent systems trained using the above-described approaches. Learning phase may be performed online or offline. Learning and using phases of the neural networks may be performed on a single device (only if hardware configuration of such device is sufficient to perform the learning phase or on separate devices (e.g. a server—for the learning phase, and a smartphone—for the using phase). Trained neural networks (in the form of weights and other parameters/processor-executable instructions) may be communicated to the computing device and stored thereon for being used subsequently.

At least one of the plurality of modules may be implemented through an AI model. A function associated with AI may be performed through the non-volatile memory, the volatile memory, and the processor. The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device using a plurality of learning data to cause, allow, or control the target device to make an image synthesis, a determination or prediction. Examples of learning algorithms include, but are not limited to, supervised learning, unsupervised learning, semi-supervised learning, or reinforcement learning and so on.

Other implementation details, datasets, and experimental data. RealEstate10 k dataset, the Local Lightfield Fusion (LLFF) dataset introduced in previous works, as well as the proposed new SWORD dataset are considered. The details of the three datasets are provided below. RealEstate10 k dataset containing consecutive frames from real estate videos with camera parameters. The subset used in the experiments consists of 10,000 scenes for training and 7,700 scenes for test purposes. The RealEstate10 k dataset serves as the most popular benchmark for novel view synthesis pipelines. Despite the relatively large size, the diversity of scenes in the dataset is limited. The dataset does not contain enough scenes with central objects, and is predominantly indoor. Consequently, models trained on RealEstate10 k generalize poorly to outdoor scenes or scenes with large closeby objects.

SWORD dataset. To evaluate proposed (and prior) methods and train the neural networks with improved performance more diverse data are necessary. Authors of the present disclosure collected a new dataset, which they call Scenes With Occluded Regions Dataset (SWORD). The new dataset contains around 1,500 train scenes and 290 test sequences, with 50 frames per scene on average. The dataset was obtained after processing the manually captured video sequences of static real-life urban scenes.

The main property of the dataset is the abundance of closeby objects and, consequently, larger prevalence of occlusions. To prove this quantitatively, occlusion areas were calculated, i.e. areas of those regions of the novel frames that are occluded in the reference frames. To get the masks for such regions, the off-the-shelf optical flow estimator was employed. According to this heuristic, the mean area of occluded image parts for SWORD is approximately five times larger than for RealEstate10 k data (14% vs 3% respectively). This rationalizes the collection and usage of SWORD and explains that SWORD allows training more powerful models despite being of smaller size.

LLFF dataset. LLFF dataset is another popular dataset with central objects that was released by the authors of Local Lightfield Fusion. It is too small to train on it (40 scenes), consequently, this dataset was used for evaluation goals only to test the models trained on other two datasets.

Evaluation details. The StereoMag system was used as the main baseline. By default, the StereoMag system uses 32 regularly spaced fronto-parallel planes (with uniformly spaced inverse depth), for which color and transparency textures are estimated by a deep network operating on a plane sweep volume. The original StereoMag system uses such plane based geometry for final renderings. In the comparisons, we refer to this baseline as StereoMag-32 or simply StereoMag.

Additionally, a variant of the Stereo-Mag (denoted as StereoMag-P) that coalesce the 32 planes into eight non-planar meshes (same number as in the default configuration proposed herein) was evaluated. Finally, for completeness, a variant of StereoMag with eight planes (StereoMag-8) was trained and evaluated. While StereoMag system was proposed some time ago, it still remains state-of-the-art for two image inputs, justifying such choice of baselines.

Training details. As mentioned above, by default the model according to the present disclosure is trained with L=8 layers unless another number is specified. All models were trained for 500,000 iterations with batch size 1 on a single NVIDIA P40 GPU. For the training, the following weights for the losses described above were set: 1 for L1 loss, 10 for perceptual loss, 5 for TV regularization, 1 for geometric loss, 5 for adversarial loss and 5 for feature matching loss. The gradient of the discriminator was penalized every 16-th step with the weight of $R_1$ penalty equal to 0.0001. Most experiments are conducted at the resolution of 256×256 except for several high resolution experiments with models trained or applied at 512×512 resolution. It should be clear for a skilled person that the training stage may be performed with other training configuration parameters.

Metrics. The standard evaluation process was used for novel view task and for measuring, how similar the synthesized view is to the ground-true image. Therefore, peak signal-to-noise ratio (PSNR), structural (SSIM) and perceptual (LPIPS [R. Zhang, P. Isola, A. A. Efros, E. Shechtman, and O. Wang. *The unreasonable effectiveness of deep features as a perceptual metric. In Proc. CVPR,* 2018]) similarity, as well as the recently introduced FLIP [P. Andersson, J. Nilsson, T Akenine-Moller, M Oskarsson, K Astrom, and M. D. Fairchild. *FLIP: A Difference Evaluator for Alternating Images. In Proc. ACM SIGGRAPH,* 2020] metric were computed between the synthesized image and the ground truth image. Both the method proposed herein and Stereo-Mag produce strong artefacts near the boundaries (though the form of artefacts are different). Therefore, the near-boundary areas were excluded from consideration by computing metrics over central crops. The results are given in the following

TABLE 1

As follows from the Table 1 the method proposed herein ("Ours (8 layers)" and "Ours (4 layers)") outperformed baselines on said datasets despite containing less layers in the scene proxy.

|  | SWORD | | | | RealEstate 10K | | | | LLFF | | | |
| --- | --- | --- | --- | --- | --- | --- | --- | --- | --- | --- | --- | --- |
|  | PSNR↑ | SSIM↑ | LPIPS↓ | FLIP↓ | PSNR↑ | SSIM↑ | LPIPS↓ | FLIP↓ | PSNR↑ | SSIM↑ | LPIPS↓ | FLIP↓ |
| StereoMag-32 | 22.933 | 0.698 | 0.126 | 0.214 | 30.805 | 0.929 | 0.025 | 0.101 | 20.015 | 0.530 | 0.147 | 0.270 |
| StereoMag-P | 21.507 | 0.666 | 0.170 | 0.265 | 26.172 | 0.881 | 0.069 | 0.186 | 18.809 | 0.582 | 0.184 | 0.324 |
| StereoMag-8 | 21.940 | 0.654 | 0.135 | 0.233 | — | — | — | — | 18.499 | 0.522 | 0.163 | 0.308 |
| Ours (8 layers) | 23.610 | 0.723 | 0.114 | 0.185 | 32.349 | 0.938 | 0.021 | 0.088 | 20.567 | 0.639 | 0.138 | 0.244 |
| Ours (4 layers) | 23.257 | 0.715 | 0.113 | 0.182 | — | — | — | — | 19.811 | 0.612 | 0.145 | 0.254 |

Finally, to measure the plausibility of produced images, the study of human preference on a crowdsourcing platform was performed. The evaluation protocol was as follows: the assessors were shown two short videos with the virtual camera moving along the predefined trajectory in the same scene from SWORD (validation subset) or LLFF: one video was obtained using the baseline model, and another one was produced with the method proposed in the present application. The users were asked which of the two videos looked more realistic to them. In total, 280 pairs of videos (120 from LLFF and 160 from SWORD scenes) were generated, and ten different workers assessed each pair. The user study results are given in the following Table 2:

| Dataset(resolution) | StereoMag | Ours | p-value |
|---|---|---|---|
| LLFF (256) | 48.9% | 51.1% | 0.221 |
| SWORD (256) | 49.5% | 50.5% | 0.425 |
| LLFF (512) | 38.7% | 61.3% | $10^{-17}$ |
| SWORD (512) | 36.4% | 63.6% | $10^{-18}$ |

The columns contain the ratio of users who selected the corresponding output as more realistic. Videos with panning, spiral and zooming motions were shown to users. For SWORD, synthetic videos corresponding to real trajectories were shown to users as well. At a lower resolution (256× 256) assessors cannot determine the winning model. At a higher resolution 512×512, users strongly prefer the results of the method proposed in the present application even though it was trained on the lower resolution and applied to the higher resolution in a fully convolutional manner, whereas the StereoMag system was retrained at high resolution.

Proposed in this application is the end-to-end pipeline that recovers the scene geometry from an input stereopair using a fixed number of semi-transparent layers. Despite using fewer layers (eight against 32 for the baseline StereoMag model), the method proposed herein demonstrated superior quality in terms of commonly used metrics for the novel view synthesis task. It has been verified that the proposed method can be trained on multiple datasets, generalizes well to unseen data and can be applied at a higher resolution. The resulting mesh geometry can be effectively rendered using standard graphics engines, making the approach attractive for mobile 3D photography. Additionally, a new challenging SWORD dataset is provided, which contains cluttered scenes with heavily occluded regions. Even though SWORD consists of fewer scenes than the popular RealEstate10K dataset, systems trained on SWORD are likely to generalize better to other datasets, e.g. the LLFF dataset.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology. The term "comprises" or "includes" is intended to indicate the openness of the list of enumerated items, i.e. means that other elements not explicitly listed may be comprised or included. The indication of a certain element in the singular form does not mean that there cannot be many of such elements, and vice versa. Particular values of parameters specified in the above description should not be construed as the limitation of the disclosed technology. Instead, these values can be considered as the values used in the preferred embodiment. However, those skilled in the art of artificial intelligence and neural network architectures will understand that such values in an actual implementation may differ from the preferred values, for example, be in the range of ±30% from the specified preferred values.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of generating a multi-layer representation of a scene, the method comprising:
   obtaining a pair of images of the scene, the pair of the images comprising a reference image and a source image;
   performing a reprojection operation on the pair of images to generate a plane-sweep volume;
   predicting, using a geometry network, a layered structure of the scene based on the plane-sweep volume; and
   estimating, using a coloring network, color values and opacity values for the predicted layered structure of the scene to obtain the multi-layer representation of the scene;
   wherein the geometry network and the coloring network are trained in end-to-end manner.

2. The method of claim 1, further comprising:
   receiving input information defining a camera pose for a new view of the scene;
   reprojecting layers of the multi-layer representation of the scene according to the camera pose; and
   composing the reprojected layers of the multi-layer representation of the scene in back-to-front order using a compose-over operator to synthesize an image with the new view of the scene.

3. The method of claim 1, wherein the pair of images is a pair of stereo images,
   wherein a camera pose of the source image to the reference image and intrinsic parameters of a camera, with which the pair of stereo images is captured, are a priori.

4. The method of claim 1, wherein the predicting the layered structure comprising:
   predicting the layered structure using the geometry network, in a camera frustum of the reference image.

5. The method of claim 1, wherein the performing the reprojection operation comprises:
   placing P fronto-parallel planes to be uniformly spaced from each other in an inverse depth space of a camera frustum of the reference image, wherein P is a natural number;
   reprojecting the source image onto the P fronto-parallel planes;
   sampling the reprojections at W×W resolution, wherein W is a positive integer; and
   concatenating the source image as an additional set of three channels to the sampled reprojections, which results in the plane-sweep volume that is in a form of W×W×(3P+3)-sized tensor.

6. The method of claim 1, wherein the layered structure of the scene comprises L layers, each layer of the L layers is defined by w×w depth map corresponding to a depth along a w×w pencil of rays uniformly spaced in a coordinate space of the reference image, wherein the predicted layered structure of the scene is a w×w×L tensor encoding a geometry of all L layers, and wherein L and w are natural numbers.

7. The method of claim 6, wherein the layers L of the predicted layered structure are reordered according to a decreasing average depth.

8. The method of claim 1, further comprising:
reprojecting the source image onto each of L layers of the predicted layered structure of the scene;
sampling the reprojections at W×W resolution; and
concatenating the reference image as an additional set of three channels to the sampled reprojections, which results in W×W×(3L+3)-sized tensor;
wherein the estimating the color values and the opacity values comprises:
processing the W×W×(3L+3)-sized tensor, using the coloring network, to obtain in W×W×4L-sized tensor comprising the estimated color values and the estimated opacity values at each of the W×W positions and at each of the L layers,
wherein L is a natural number and W is a positive integer.

9. The method of claim 1, wherein the geometry network and the coloring network are trained based on a training dataset of short videos of static scenes, for which camera pose sequences are estimated using Structure from Motion (SfM) technique.

10. The method of claim 9, wherein the geometry network and the coloring network are trained in the end-to-end manner by minimizing a weighted combination of one or more of an image-based perceptual loss, an adversarial loss, a geometric loss, a total variation (TV) loss, and a feature matching loss.

11. The method of claim 10, further comprising computing the image-based perceptual loss at one or more training iterations, wherein the computing the image-based perceptual loss comprises
sampling a triplet $(I_s; I_r; I_n)$ of images comprising a source training image, a reference training image, and a hold-out training image of a scene from a training video of the training dataset, wherein $I_s$, $I_r$, and $I_n$ denote the source training image, the reference training image, and the hold-out training image, respectively;
performing the reprojection operation on the source training image and the reference training image to generate a plane-sweep volume;
predicting, using the to-be-trained geometry network, a layered structure of the scene of the training video based on the plane-sweep volume;
estimating, using the to-be-trained coloring network, color values and opacity values of the training video for the predicted layered structure of the scene of the training video;
generating a multi-layer representation of the scene of the training video based on the predicted layered structure of the scene and the estimated color values and opacity values of the training video;
synthesizing an image with a new view of the scene of the training video by reprojecting layers of the multi-layer representation of the scene according to a camera pose, with which the hold-out training image is captured;
computing the image-based perceptual loss between the synthesized image and the holdout image; and
backpropagating the computed image-based perceptual loss through the geometry network and the coloring network.

12. The method of claim 10, wherein further comprising computing the adversarial loss at one or more training iterations, wherein the computing the adversarial loss comprises:
sampling a triplet $(I_s; I_r; I_n)$ of images comprising a source training image, a reference training image, and a hold-out training image of a scene from a training video of the training dataset, wherein $I_s$, $I_r$, and $I_n$ denote the source training image, the reference training image, and the hold-out training image, respectively;
performing the reprojection operation on the source training image and the reference training image to generate a plane-sweep volume;
predicting, using the to-be-trained geometry network, a layered structure of the scene of the training video based on the plane-sweep volume;
estimating, using the to-be-trained coloring network, color values and opacity values of the training video for the predicted layered structure of the scene of the training video;
generating a multi-layer representation of the scene of the training video based on the predicted layered structure of the scene and the estimated color values and opacity values of the training video;
synthesizing an image with a new view of the scene by reprojecting layers of the multi-layer representation of the scene according to a camera pose, with which the hold-out training image is captured;
processing, using a to-be-trained discriminator network, the synthesized image to compute a synthesized score of the synthesized image;
processing, using the to-be-trained discriminator network, the hold-out training image to compute a real score of the hold-out training image;
computing the adversarial loss as a minimax loss between the synthesized score and the real score; and
backpropagating the computed adversarial loss through the to-be-trained geometry network, the to-be-trained coloring network, and the to-be-trained discriminator network.

13. The method of claim 10, further comprising computing the geometric loss at one or more training iterations, the computing the geometric loss comprises:
sampling a triplet $(I_s; I_r; I_n)$ of images comprising a source training image, a reference training image, and a hold-out training image of a scene from a training video of the training dataset, wherein $I_s$, $I_r$, and $I_n$ denote the source training image, the reference training image, and the hold-out training image, respectively;
performing the reprojection operation on the source training image and the reference training image to generate a plane-sweep volume;
predicting, using the to-be-trained geometry network, a layered structure of the scene of the training video based on the plane-sweep volume;
computing the geometric loss between the predicted layered structure and a real sparse point cloud corresponding to the scene in the hold-out training image, the real sparse point cloud being estimated using Structure from Motion (SfM) technique; and
backpropagating the computed geometric loss through the to-be-trained geometry network $F_g$.

14. The method of claim 10, further comprising computing the TV loss at one or more training iterations, wherein the computing the TV loss comprises:
sampling a triplet $(I_s; I_r; I_n)$ of images comprising a source training image, a reference training image, and a holdout training image of a scene from a training video of the training dataset, wherein $I_s$, $I_r$, and $I_n$ denote the source training image, the reference training image, and the hold-out training image, respectively;

performing the reprojection operation on the source training image and the reference training image to generate a plane-sweep volume;

predicting, using the to-be-trained geometry network, a layered structure of the scene of the training video based on the plane-sweep volume;

computing a total variation for each layer in the predicted layered structure and an averaged variation across the layers of the predicted layered structure as the TV loss; and backpropagating the computed TV loss through the to-be-trained geometry network.

15. A non-transitory computer-readable storage medium storing a program that is executable by a computer to perform a method of generating a multi-layer representation of a scene, the method comprising:

obtaining a pair of images of the scene, the pair of the images comprising a reference image and a source image;

performing a reprojection operation on the pair of images to generate a plane-sweep volume;

predicting, using a geometry network, a layered structure of the scene based on the plane-sweep volume; and estimating, using a coloring network, color values and opacity values for the predicted layered structure of the scene to obtain the multi-layer representation of the scene.

* * * * *